United States Patent [19]
Daily et al.

[11] Patent Number: 6,111,887
[45] Date of Patent: Aug. 29, 2000

[54] METHOD AND APPARATUS FOR POWER TUNING A TERMINAL OF A BI-DIRECTIONAL COMMUNICATIONS SYSTEM

[75] Inventors: Mack S. Daily, Round Lake Park, Ill.; Thomas M. Johnson, Franklin, Wis.; Thomas E. Pennacchia, Palatine, Ill.

[73] Assignee: Zenith Electronics Corporation, Glenview, Ill.

[21] Appl. No.: 08/947,038

[22] Filed: Oct. 8, 1997

[51] Int. Cl.[7] .................................................. H04L 12/403
[52] U.S. Cl. ...................... 370/449; 370/347; 340/825.08
[58] Field of Search ..................................... 370/449, 422, 370/345, 346, 241, 245, 312, 404, 431, 432; 455/5.1, 4.1, 68, 69, 77; 340/825.06, 825.07, 825.08

[56] References Cited

U.S. PATENT DOCUMENTS

| | | | |
|---|---|---|---|
| 4,512,033 | 4/1985 | Schrock | 455/2 |
| 4,554,579 | 11/1985 | Citta | 348/10 |
| 5,208,854 | 5/1993 | West, Jr. | 380/7 |
| 5,586,121 | 12/1996 | Moura et al. | 370/404 |
| 5,745,837 | 4/1998 | Fuhrmann | 455/5.1 |
| 5,790,523 | 8/1998 | Ritchie et al. | 370/241 |
| 5,946,322 | 8/1999 | Moura et al. | 370/468 |

*Primary Examiner*—Ajit Patel
*Assistant Examiner*—Brian Nguyen

[57] ABSTRACT

A method and apparatus for power tuning a terminal of a bi-directional communications system, such as a cable television plant. An iterative or cycle method is used to achieve a proper terminal transmitter power level at a remote terminal. A polling signal is transmitted in a downstream direction from a controller to the terminal. If the controller receives a status signal which is transmitted upstream from the terminal, then the controller compares a received power level measured at a head end against a predetermined range of acceptable power levels. If the power level is outside of the predetermined range, then the controller calculates and transmits a terminal transmitter power level in a downstream direction to the terminal. The iterative or cyclic method repeats until the received power level is within the predetermined range. If the received power level of the terminal remains outside of the predetermined range after a specified count of cycles or iterations or if the head end does not receive a status signal, then the controller either aborts the cycle or attempts to revive the terminal.

13 Claims, 6 Drawing Sheets

METHOD AND APPARATUS FOR POWER TUNING A TERMINAL OF A BI-DIRECTIONAL COMMUNICATIONS SYSTEM

BACKGROUND OF THE INVENTION

1. Field of the Invention

This invention relates to power tuning a terminal of a bi-directional communications system operating with at hybrid fiber-coax plant by analyzing a power level and a signal level transmitted upstream from the terminal to a head end.

2. Description of Prior Art

Hybrid fiber-coax (HFC) plants have been used in cable television (CATV) communications systems. Conventional HFC systems often experience problems when transmitting signals in an upstream or reverse transmission direction. In conventional HFC systems, power levels can be controlled in a downstream direction by amplifying the signals at a particular location, such as at the head end or at a downstream amplifier. Because the number of amplifying stations maintained is at a relative minimum, manually tuning the amplifying stations may be practical and economical.

However, a greater number of signal generators exist when transmitting an upstream signal. For example, in a CATV system a remote terminal, such as a settop box or a "decoder", is located at each subscribers residence. Thus, the number of terminals is relatively large and it is difficult to manually power tune each terminal.

It is important to properly tune the terminals in a conventional HFC system. Weak signals may not be transmitted by a coax-to-fiber converter. Upstream signals which are too strong can overdrive the laser and either burn out the laser or transmit a distorted signal and thereby distort all signals regardless of the source.

Conventional power tuning methods are similar to power adjustment methods. A command signal is transmitted to the terminal with a message to either increase or decrease the terminal transmitter power level at the terminal. The terminal is then polled and, if a response signal is received, the received power level is measured. If the received power level remains incorrect, another adjustment signal is transmitted to increment the power level up or down, as necessary. According to conventional power tuning methods, such cycle continues until the received power level is either correctly adjusted or the iteration process is aborted.

If a terminal responds to the polling signal, the terminal returns its terminal transmitter power level, typically as an ordinal number. With such conventional HFC system, when the head end transmits a signal to adjust the terminal transmitter power level by one increment, a terminal transmitter power level number is transmitted as one increment greater, in the next polling signal. Once a maximum or a minimum terminal transmitter power level is reached, the terminal transmitter power level number remains at such value.

U.S. Pat. No. 4,512,033 teaches a remote level adjustment system for use in a multi-terminal communications system. Remote terminals transmit and receive signals through a network and also respond to a polling signal by transmitting signals with information from respective terminal sites. A master terminal has a program and a circuit for transmitting level-setting signals and a receiver measures the power level of reply signals from selected remote terminals, deciding whether to adjust the power level and for transmitting a level-setting adjustment signal.

U.S. Pat. No. 4,554,579 discloses a two-way CATV system in which multiple subscriber address codes are assigned to multiple subscriber terminals. Each subscriber terminal has a decoder which compares a unique address code of the subscriber terminal with a received subscriber address code. If the address codes match, an address match signal is generated from a multibit pulse coded downstream command signal for initiating various command functions, including power adjustment.

U.S. Pat. No. 5,586,121 teaches an asymmetric network communications system in which a network manager, such as a hybrid access system, effects transmission of packets of data on a forward or downstream channel to multiple downstream subscribers. Forward and return channels are located on the same or different communication medium, such as a cable television network, direct broadcast satellite network, television or radio RF broadcast network. The network manager handles or controls the forward and return communication to establish interactive full-duplex real-time network sessions between the host and a selected subscriber device.

In view of the conventional technology, there is an apparent need to upgrade head end software so that the head end or a controller can calculate and set a power level based upon data received through an upstream status signal transmitted by the terminal.

SUMMARY OF THE INVENTION

It is one object of this invention to provide a method for operating more efficiently on a bi-directional communications system, particularly when a terminal is transmitting data in an upstream direction.

It is another object of this invention to provide a method and a communications system that calculates rather than increments a desired terminal transmitter power level by comparing signal levels received from a remote terminal against a predetermined range of parameters.

It is still another object of the invention to provide a method and a communications system that reduces the number of upstream signals that a terminal needs to transmit, in order to properly adjust the terminal transmitter power level.

The above and other objects of this invention are accomplished by adjusting the terminal transmitter power level of a terminal based upon data received in and measured on an upstream status signal transmitted by the terminal to the head end. Data corresponding to the measured power level is compared against a predetermined range of power levels. A new terminal transmitter power level is then calculated as a function of particular parameters. The new terminal transmitter power level setting is then transmitted, from the head end, downstream to the terminal.

If the power level measured from the terminal is not within a predetermined signal range, then the power tuning steps continue as an iterative process. If the terminal is silent and does not respond with or transmit a return signal indicating the current power level, then a silent count is incremented and a new power level signal is transmitted to the terminal until the terminal either responds or is determined to be absent without leave (AWOL). If determined AWOL, the terminal can be marked for further manual or automatic power tuning.

BRIEF DESCRIPTION OF THE DRAWINGS

These above-mentioned and other features and objects of this invention will be better understood from the following detailed description when taken in view of the drawings wherein.

DESCRIPTION OF PREFERRED EMBODIMENTS

Figure 1:
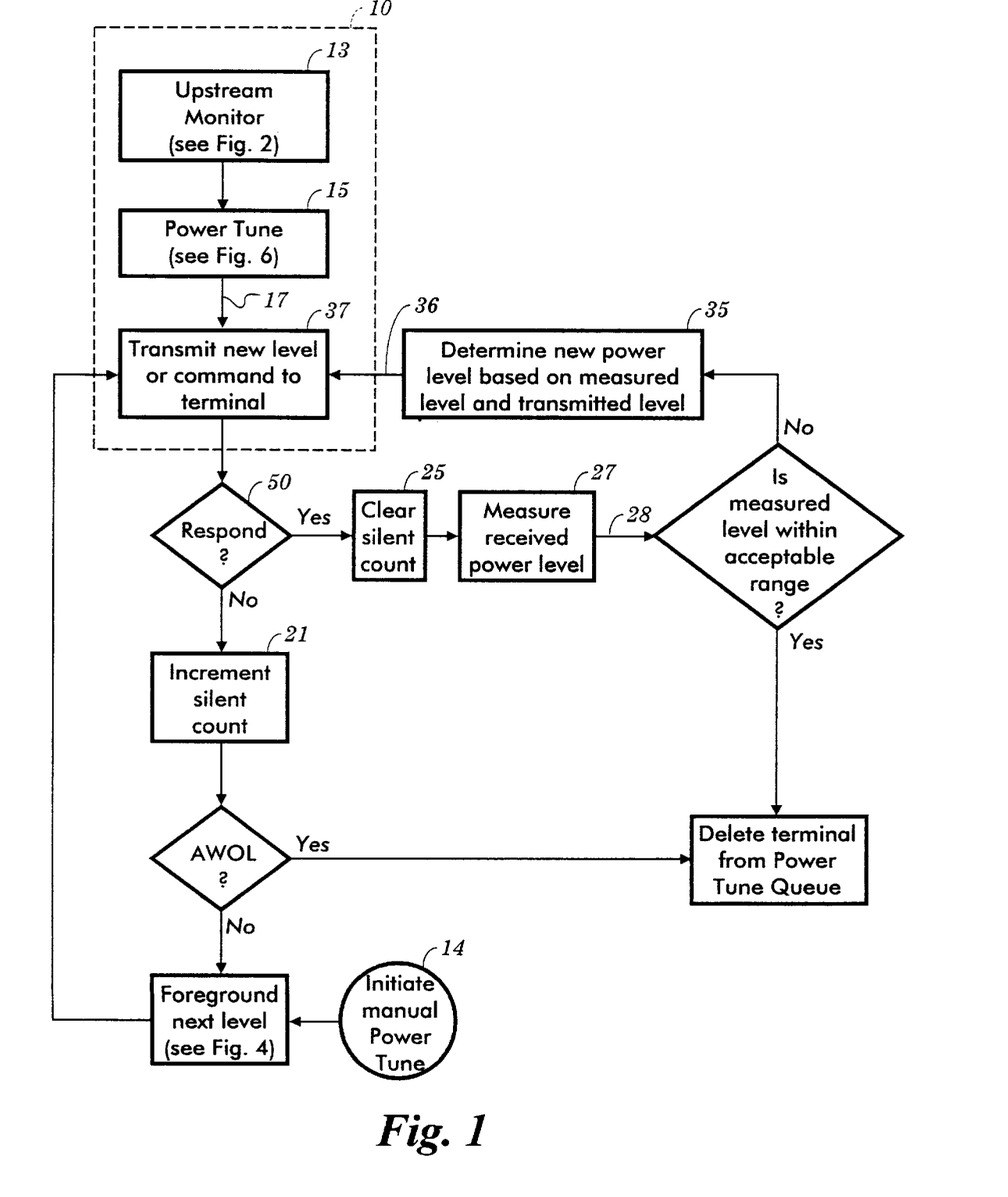
FIG. 1 is a block diagram showing a method for power tuning a remote terminal, according to one preferred embodiment of this invention.

Referring to FIG. 1, the block diagram shows logic for background processing of software associated with controller 10 for power tuning terminal 50. According to one preferred embodiment of this invention, each terminal 50 in the communications system is polled in a cyclic manner. FIG. 1 shows the method associated with power tuning one terminal 50.

Figure 4:
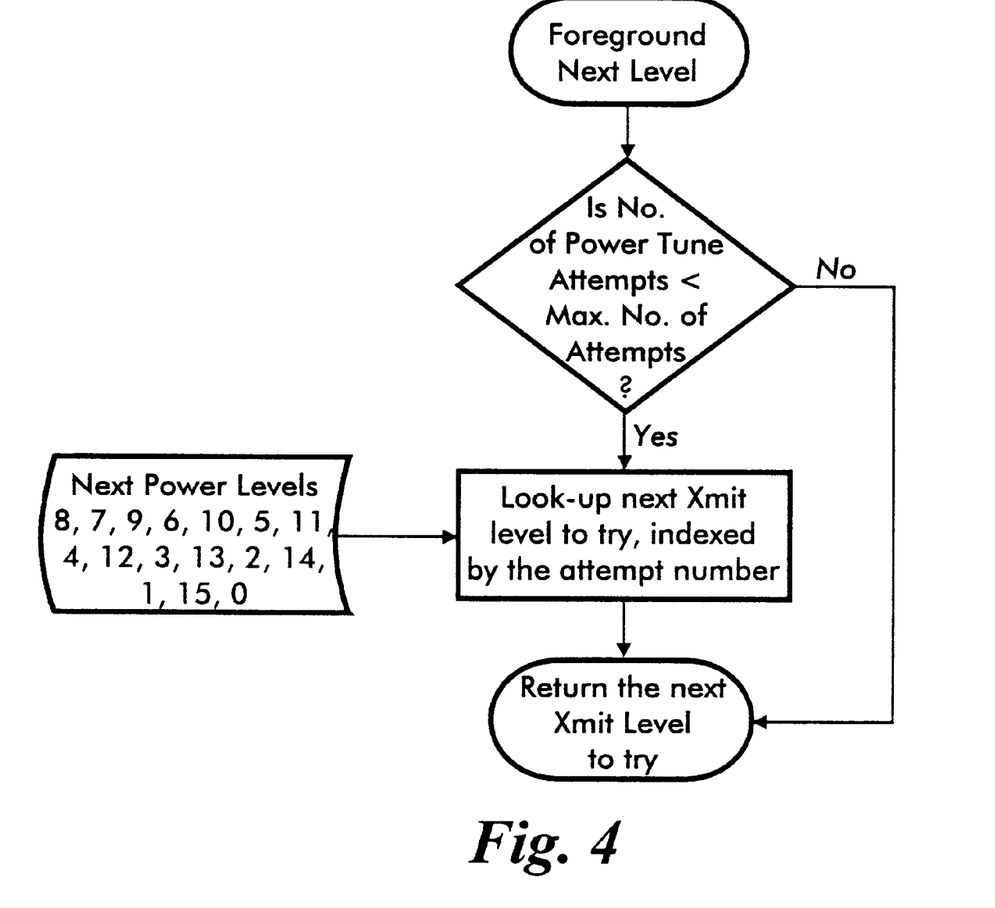
FIG. 4 is a block diagram showing a method for a foreground power tuning mode which allows manual power tuning, according to one preferred embodiment of this invention.

As shown in FIG. 1, one particular terminal 50 is continuously monitored at step 13. In one preferred embodiment according to this invention, a plurality of terminals 50 are continuously monitored at step. Polling signal 17 is transmitted in a downstream direction, as shown by an arrow in FIG. 1, to terminal 50. If terminal 50 does not respond within a predetermined time period, a silent count is incremented at step 21. If the silent count reaches a predetermined maximum value, terminal 50 is considered absent without leave (AWOL) and the software of controller 10 will either try to revive or will delete from a power tune queue that particular terminal 50. The AWOL terminals 50 can be archived or otherwise stored for future reference. FIG. 4 shows the method of reviving a particular terminal 50, according to one preferred embodiment of this invention.

As shown in FIG. 4, any terminal 50 including any AWOL terminal 50 can be manually power tuned. As shown in FIG. 1, the manual power tune is preferably initiated at step 14 and transmits a signal as at step 37.

Figure 2:
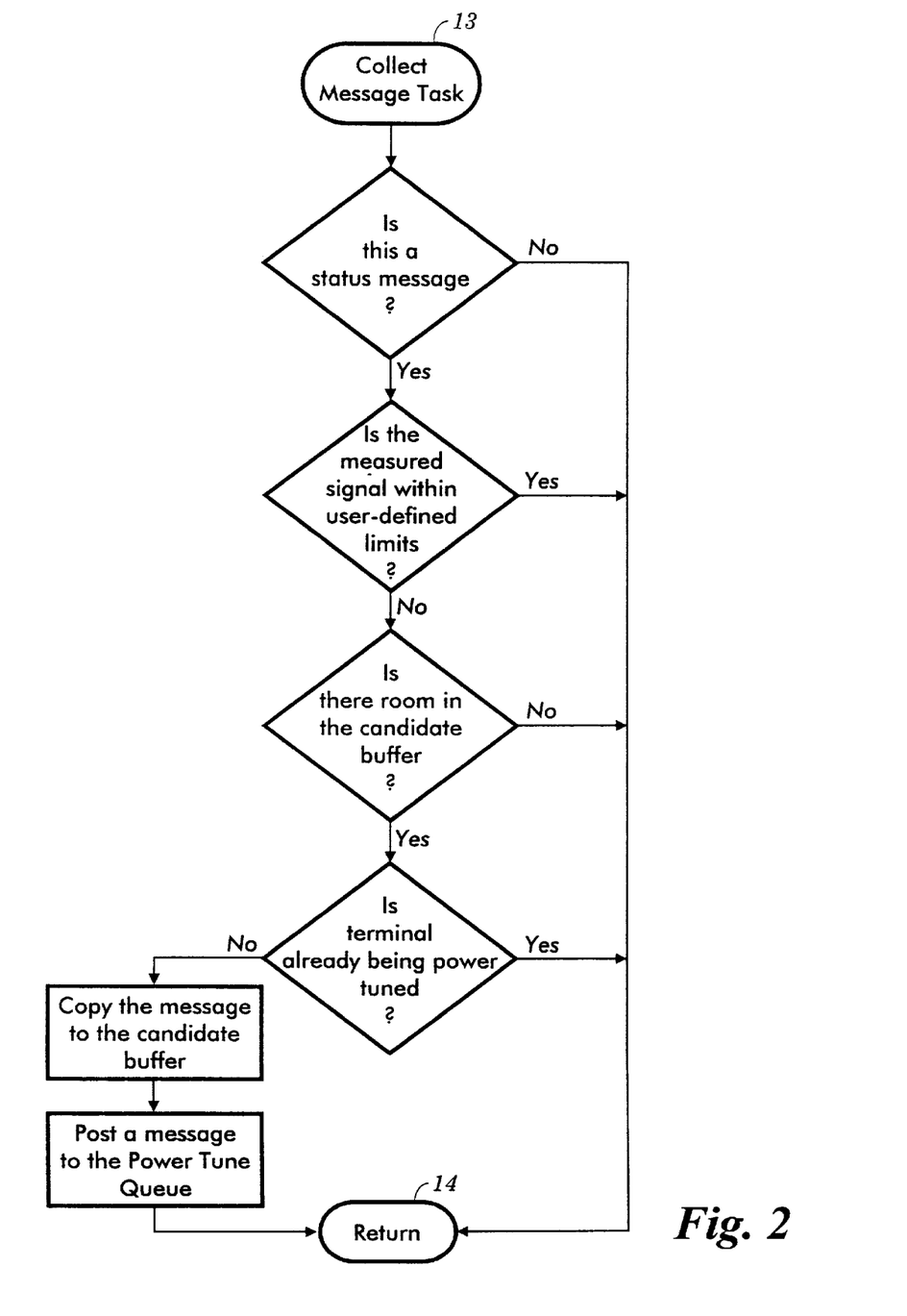
FIG. 2 is a block diagram showing a method for monitoring upstream messages received from a remote terminal, according to one preferred embodiment of this invention.

Referring to FIG. 1, if terminal 50 does respond to polling signal 17, then the silent count is cleared at step 25. At step 27 the received power level 28 of terminal 50 is measured. Controller 10 then compares, as shown in FIG. 2, the received power level 28, shown in FIG. 1, to a predetermined signal range of acceptable power levels. If the received power level 28 of the transmission by terminal 50 is within the predetermined signal range, then terminal 50 is returned to a pool for cyclic polling.

Figure 3:
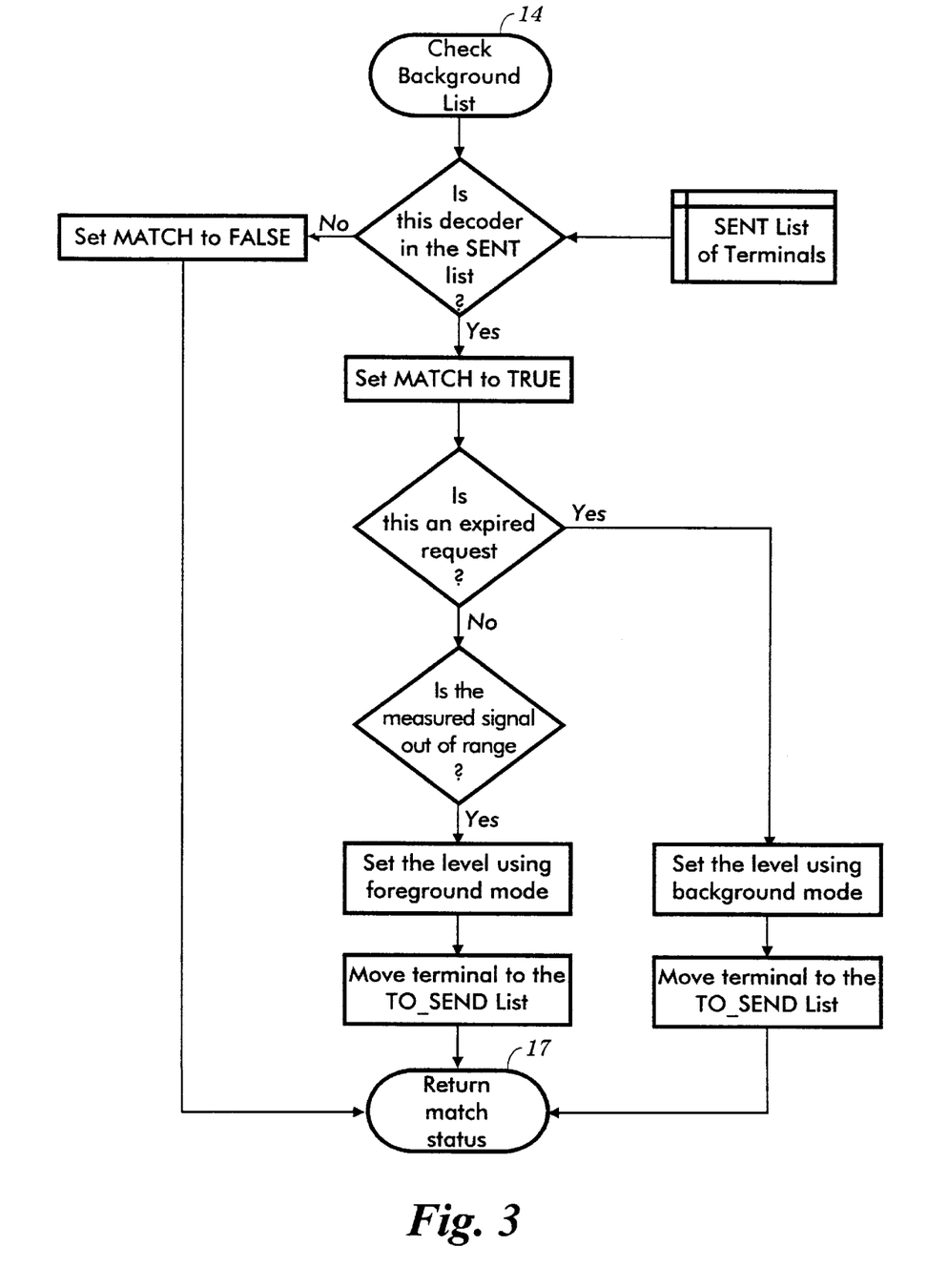
FIG. 3 is a block diagram showing a method for power tuning a remote terminal, according to one preferred embodiment of this invention.
Figure 6:
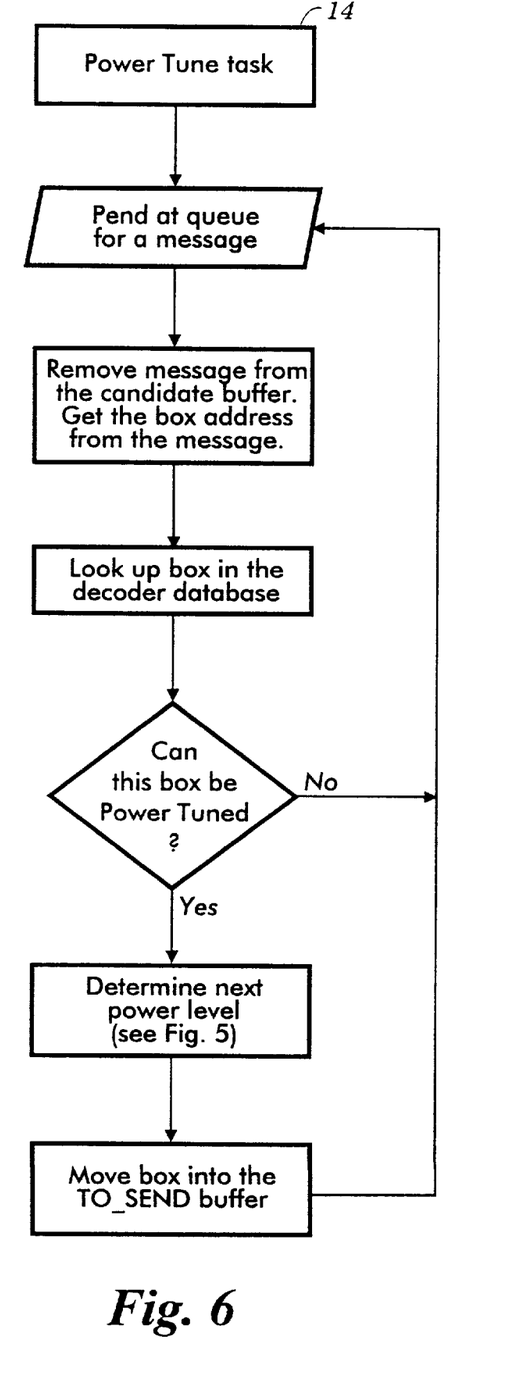
FIG. 6 is a block diagram showing a method for power tuning a remote terminal, according to another preferred embodiment of this invention.

If the received power level 28 of terminal 50 is not within the predetermined signal range, controller 10 calculates, as shown in FIG. 3, a new terminal transmitter power level as a function of predetermined parameters. In one preferred embodiment according to this invention, at step 35, controller 10 calculates a new terminal transmitter power level 36 which is transmitted at step 37 to terminal 50. One preferred method of a power tune task is shown in FIG. 6. Terminal 50 is then returned to the pool for cyclic polling.

In one preferred embodiment according to this invention, an algorithm for determining the new terminal transmitter power level signal 36 is calculated according to the following equation.

$$\begin{array}{c}\text{New Terminal} \\ \text{Transmitter} \\ \text{Power Level}\end{array} = \left[\dfrac{\left(\dfrac{\text{MAX}+\text{MIN}}{2}\right) - \begin{array}{c}\text{Received} \\ \text{Power Level}\end{array}}{\text{Stepsize}}\right] + \begin{array}{c}\text{Old Terminal} \\ \text{Transmitter} \\ \text{Power Level}\end{array}$$

| Variable | Type | Example | Description |
|---|---|---|---|
| New Terminal Transmitter Power Level | Ordinal | Calculated | New power level value to be used by the terminal |
| MAX | dB | 10 dB | Maximum acceptable power level |
| MIN | dB | 6 dB | Minimum acceptable power level |
| Received Power Level | dB | 4 dB | Power level measured at the head end |
| Stepsize | dB | 2 dB | Size of each change in the New Power Level and Terminal Level |
| Old Terminal Transmitter Power | Ordinal | 3 | The power level at which the terminal transmitted |

For example, terminal 50 is polled and responds by transmitting at a terminal transmitter power level magnitude of 3. The received power level 28 measured at controller 10 is 4 dB below a midpoint of an acceptable range. In one preferred embodiment according to this invention, there are 256 incremental steps, such as values ranging from zero to 255 that correspond to a range of −99 dBmV to 31 dBmV. A lookup can be used to store data, such as in an array, which is used to select a new polling signal setting to transmit to terminal 50.

Figure 5:
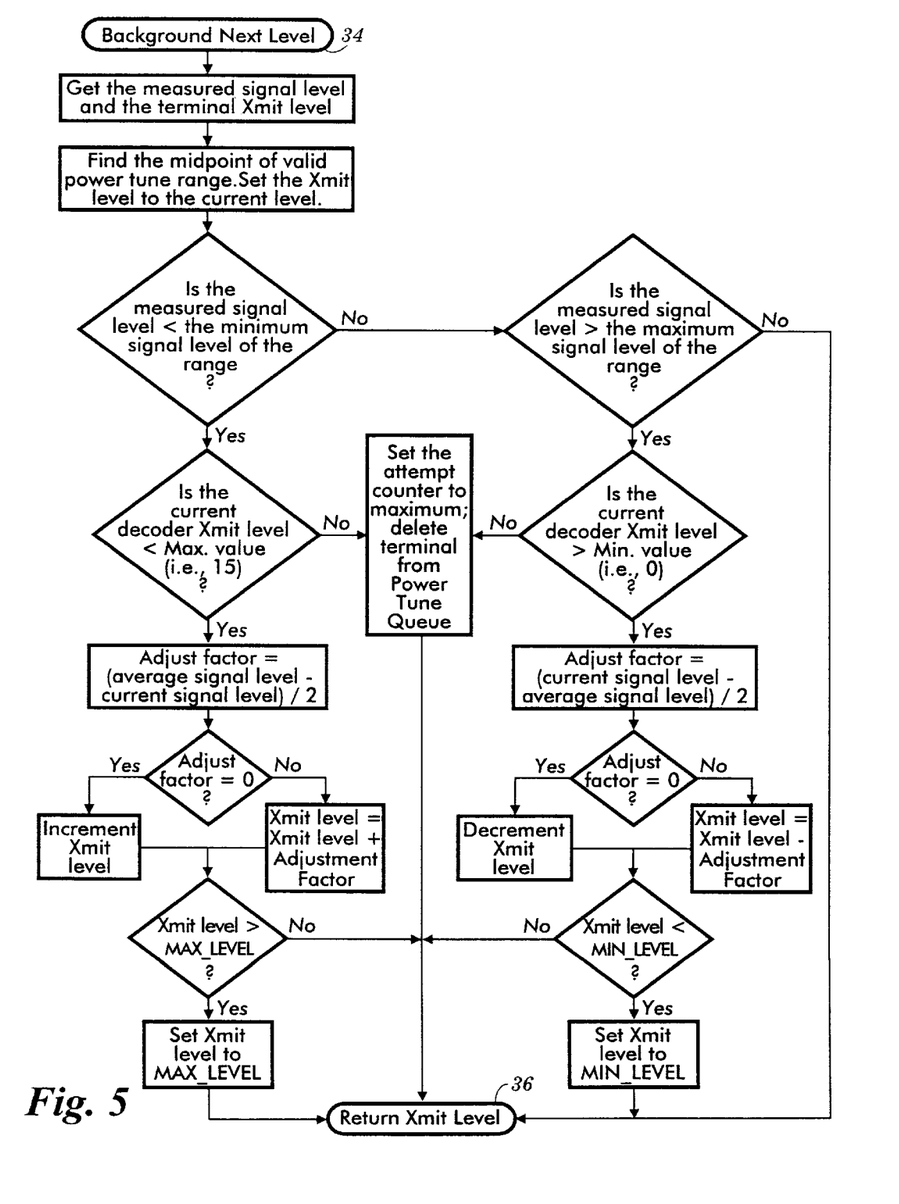
FIG. 5 is a block diagram showing a method for a background power tuning mode wherein upstream data received from a remote terminal is automatically monitored, according to one preferred embodiment of this invention.

If the calculated new terminal transmitter power level is less than zero, then the terminal transmitter power level transmitted to terminal 50 is zero. As shown in FIG. 5, if the calculated new power level is greater than a maximum value allowed, the terminal transmitter power level transmitted to terminal 50 is the maximum value allowed.

According to this invention, power tuning operates in a background mode and a foreground mode. The background mode preferably runs continuously, as follows. Every time the head end controller receives a status packet from a terminal, a "verify power level" function is called. The verify power level function compares the measured power level to a desired "tune signal level" range. If the received power level is out of a desired range and a terminal is not already power tuning, the terminal is moved to a candidate buffer and a message is posted to a power tune queue. An operator can configure the range, because communication networks, such as cable plants, have different signal characteristics.

A power tune task waits for a message in the power tune queue, as shown in FIG. 6. When a message is received the controller looks in the candidate buffer for a terminal. The terminal is then removed from the candidate buffer and a terminal record is requested from a decoder database. Based upon certain conditions proving true, the controller will calculate a new terminal transmitter power level for the terminal and store the information in a to-send buffer for transmitting downstream signals, otherwise the terminal is ignored.

A fill task is used to build downstream messages or signals to the terminals. The fill task uses a power tune routine that adds power tune command, which interrogates the terminal, to the output buffer. Such routine removes information from the to-send buffer downstream, adds the information to the down stream buffer, adds the information to the pending interrogate buffer an stores the information in a "Power tune sent" buffer. The "pending interrogate" buffer cycles so that any requests not replied to after a specific time period are processed as an expired reply.

Up stream decoder data is processed by a "collect message" task, as shown in FIG. 2. The controller inspects all status packets and runs a routine that matches the status packets to request, in the "pending interrogate" buffer. When a match is detected, the controller passes the status packet as a reply to the routine associated with interrogating the terminal. For example, the routine may include a fast list reply, a long list reply, an individual list reply, a power tune reply or the like. The routines are called upon if a reply is not received within a specific time period or time limit.

The "power tune reply" routine matches a reply message with the decoder record in the power tune sent buffer, as shown in FIG. 3. The terminal record is removed from the sent buffer if there is a match or if the timer associated with the request expires. When a match occurs, the process, cycle or iteration starts over with comparing the power level to an acceptable window and a new command containing a new power level is generated, if necessary. If a terminal is not responding, a counter is incremented or increased and the next power level is transmitted if the counter is less than a specified number, such as 16. The controller will tune, or adjust, the terminal transmitter power level at a particular level and then as necessary, will continue incrementing or adjusting outward toward a minimum power level value and a maximum power level value, in an attempt to prompt a response from the terminal. Although the terminal may be responding to interrogation by the controller, a signal level of a status packet may be too weak or too strong for the controller to correctly detect.

The foreground power tune can be performed by an operator or by a command. The power tune reply code can be distinguished between a foreground power tune process and a background power tune process. When the controller operates in a foreground power tune mode and the controller receives a reply from a terminal, a status packet is sent to a reply mail box and then transmitted back to the operator. The data informs the operator of the status of the power tune process and allows the operator to update as necessary. The operator can manually cancel the process.

As shown in FIG. 1, if terminal 50 is determined AWOL, then controller 10 deletes terminal 50 from the power tune list. As shown in FIG. 2, all possible or predetermined terminal transmitter power levels are attempted until terminal 50 transmits a response. It is also possible to enter the foreground tuning method shown in FIG. 4 by an external entity, such as an operator requesting a power tune, which is foreground processing. If a response from terminal 50 is received by applying the background tuning method shown in FIG. 5, then the software of controller 10 preferably passes the method to transmit step 37, as shown in FIG. 1.

The possible terminal transmitter power levels attempted are preferably predefined. As shown in FIG. 4, different power levels can be attempted in sequential order or by starting at a midpoint of the predetermined signal range and working outward toward a maximum power level and a minimum power level. If terminal 50 does not respond to any of the attempted power levels, then terminal 50 is considered to still be AWOL and an abort signal can be transmitted back to controller 10. As shown in FIG. 4, the starting power level is selected, preferably but not necessarily at or near a midpoint of the predetermined signal range, and a terminal transmitter power adjust signal is transmitted to terminal 50. As shown in FIG. 4, the starting power level can be selected at a magnitude of 8 when the predetermined signal range is set at 16 values, zero to 15. If terminal 50 does not respond, the next power level is selected and the next terminal transmitter power adjust signal is transmitted back to terminal 50 until either terminal 50 responds or until that particular transmitter 50 is deleted from the power tune queue.

In one preferred embodiment according to this invention, the calculated terminal transmitter power level is determined as a function of at least one of the minimum power tune level of the predetermined signal range, a maximum power tune level of the predetermined signal range, a received power level measured at the controller, an incremental power level step and the terminal transmitter power level.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. A method for power tuning a terminal of a bi-directional communications system, an iteration of the method comprising:
   (a) transmitting a polling signal in a downstream direction from a controller to the terminal;
   (b) receiving in the controller a status signal transmitted upstream from the terminal, comparing a received power level of the status signal against a predetermined signal range; and
   (c) if the received power level is outside of the predetermined signal range, calculating a new terminal transmitter power level and transmitting the new terminal transmitter power level in the downstream direction to the terminal.

2. The method according to claim 1 wherein a head end transmits the polling signal.

3. The method according to claim 1 wherein the terminal is located remote with respect to the head end.

4. The method according to claim 1 wherein the received power level is measured at the head end.

5. The method according to claim 1 wherein the terminal transmitter power level is calculated as a function of at least one of a minimum power tune level of the predetermined signal range, a maximum power tune level of the predetermined signal range, a received power level measured at the controller, an incremental power level step, and the old terminal transmitter power level.

6. The method according to claim 5 wherein the function is equal to the old terminal transmitter power level plus a quantity equal to a difference between an average power level at a midpoint between the minimum power tune level and the maximum power tune level and the power level measured at the controller divided by the incremental power level step.

7. The method according to claim 1 wherein if the controller fails to receive the status signal a silent count of the polling signal is incremented to form an incremented polling signal, and a cycle is repeated with the incremented polling signal.

8. The method according to claim 7 wherein if the silent count reaches a maximum value the controller attempts to revive the terminal.

9. The method according to claim 8 wherein reviving the terminal comprises transmitting at least one terminal transmitter power level signal to the terminal until the controller receives the status signal transmitted from the terminal.

10. The method according to claim 9 wherein if the controller receives the status signal from the terminal a cycle is repeated.

11. The method according to claim 9 wherein if all of the terminal transmitter power level signals in the signal range are transmitted to the terminal and the controller fails to receive the status signal, a fault signal identifying a fault of the terminal is determined by the controller.

12. A method for power tuning a terminal of a bi-directional communications system, an iteration of the method comprising:

(a) transmitting a polling signal in a downstream direction from a controller to the terminal;

(b) receiving in the controller a status signal transmitted upstream from the terminal, comparing a received power level of the status signal against a predetermined signal range; and (c) if the received power level is outside of the predetermined signal range, determining a new terminal transmitter power level and transmitting the new terminal transmitter power level in the downstream direction to the terminal; and (d) wherein the terminal transmitter power level is determined as a function of at least one of a minimum power tune level of the predetermined signal range, a maximum power tune level of the predetermined signal range, a received power level measured at the controller, an incremental power level step, and the received old terminal transmitter power level; and (e) wherein the function is equal to the old terminal transmitter power level plus a quantity equal to a difference between an average power level at a midpoint between the minimum power tune level and the maximum power tune level and the power level measured at the controller divided by the incremental power level step.

13. A method for power tuning a terminal of a bi-directional communications system, an iteration of the method comprising:

(a) transmitting a polling signal in a downstream direction from a controller to the terminal;

(b) receiving in the controller a status signal transmitted upstream from the terminal, comparing a received power level of the status signal against a predetermined signal range; and (c) if the received power level is outside of the predetermined signal range, determining a new terminal transmitter power level and transmitting the new terminal transmitter power level in the downstream direction to the terminal; and (d) wherein if the controller fails to receive the status signal a silent count of the polling signal is incremented to form an incremented polling signal, and a cycle is repeated with the incremented polling signal; and (e) wherein if the silent count reaches a maximum value the controller attempts to revive the terminal; and (f) wherein reviving the terminal comprises transmitting at least one terminal transmitter power level signal to the terminal until the controller receives the status signal transmitted from the terminal; and (g) wherein if all of the terminal transmitter power level signals in the signal range are transmitted to the terminal and the controller fails to receive the status signal, a fault signal identifying a fault of the terminal is determined by the controller.

* * * * *